(No Model.)
S. E. SMITH.
VALVE.
No. 550,231. Patented Nov. 19, 1895.
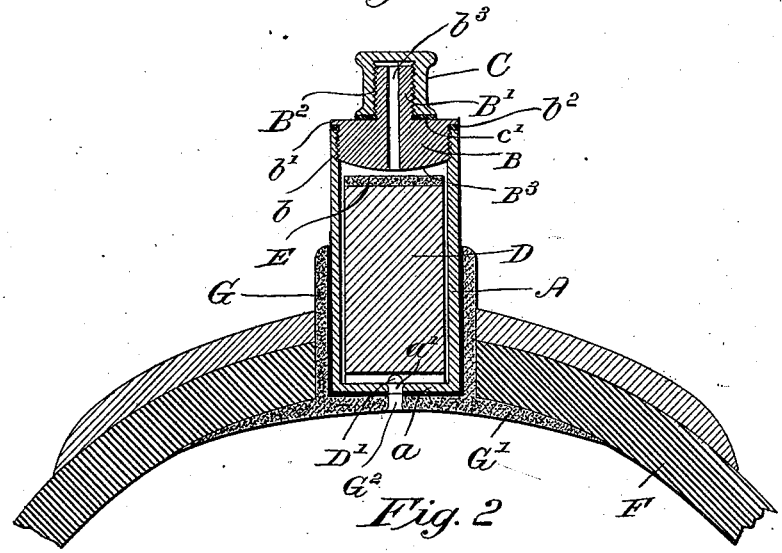
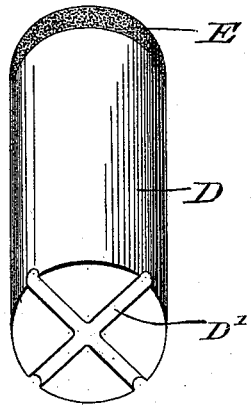
Witnesses:
M. B. Harris
M. F. Boyle
Inventor
Samuel E. Smith
by his attorneys
Thomas Spees Stetson

UNITED STATES PATENT OFFICE.

SAMUEL E. SMITH, OF BABYLON, ASSIGNOR TO HIMSELF, AND FRANCIS C. FELDMANN, OF BROOKLYN, NEW YORK.

VALVE.

SPECIFICATION forming part of Letters Patent No. 550,231, dated November 19, 1895.

Application filed December 29, 1894. Serial No. 533,269. (No model.)

*To all whom it may concern:*

Be it known that I, SAMUEL E. SMITH, a citizen of the United States, residing in Babylon, Suffolk county, in the State of New York, have invented a certain new and useful Improvement in Valves, of which the following is a specification.

My invention is particularly applicable as an air-valve. It is very simple, light, and easy.

In carrying out my invention I provide a tube or socket of metal, having a small aperture at one end and an apertured plug or cover at the other end, and within said tube or socket is a plain and light sliding stem or body of a little less diameter than the bore of said tube or socket, so that air can pass between said stem and the inner walls of said tube or socket. At the inner end of said stem are one or more cross-grooves leading to its outer side and aligned with the aperture in the tube or socket, so that air can pass through said groove or grooves to said aperture. On the opposite end of said stem is a thin cushion or packing of rubber, which is adapted to press against the plug or cover in the end of the tube or socket to close the aperture in the latter to prevent the outflow of air. The plug is equipped with a threaded stud, through which the aperture is extended. It permits a pump to be connected to enable air to be pumped into and through the valve. A tightly-fitted cap applies on the stud to make the valve still more secure when the hose is disconnected.

Reference is to be had to the accompanying drawings, wherein—

Figure 1 is a central cross-section of my improved valve, and Fig. 2 is a perspective view of the valve-stem.

In the accompanying drawings, in which similar letters of reference indicate corresponding parts in both views, the letter A indicates a tube or socket having a head or disk $a$ at one end provided with an aperture $a'$ for the passage of air. At the opposite end of the tube or socket A is a plug B, which is removably connected with said tube, the parts A and B being shown connected by screw-threads $b$. The plug or cover B is shown provided with a flange $b'$, which rests against the end of the tube A to make an airtight fit at that point. A washer or gasket $b^2$ may be placed between the parts A and $b'$, if desired, to insure a tight joint. The plug or cover B has a central aperture $b^3$ for the passage of air into the tube or socket A. On the plug or cover B is a stud B', (shown provided with threads $B^2$ to receive corresponding threads in a cap C,) which screws on the stud B' to prevent the escape of air. A washer $c'$ may be provided between the plug B and cap C to insure a tight joint between said parts. When the cap is removed, the stud B' is adapted to receive a hose or coupling to connect it with a suitable air-pump in well-known manner.

The inner face $B^3$ of the plug or cover B is convex, as shown, the aperture $b^3$ opening through said plug or cover at the outer point or apex of said curved or rounded face. Within the tube or socket A is a freely-reciprocating plunger-body or valve-stem D, which is cylindrical in form, having flat ends and slightly shorter than the distance between the inner faces of the head or disk $a$ and the plug or cover B, to permit said stem D to have slight longitudinal movement within the tube or socket A. The stem D is also a little of less diameter than the bore of the tube or socket A, so that air can pass along the sides of said stem. On the inner end of the stem D are one or more cross-grooves D', which extend to the outer sides or periphery of said stem to permit air to pass from around said stem to the aperture $a'$ in the disk $a$. The groove or grooves D' are aligned with the aperture $a'$, as shown.

At the opposite or outer end of the stem D is placed a cushion or packing E in disk form, preferably of rubber, which is adapted to fit against the rounded or convex end $B^3$ of the plug or cover B, to tightly close the aperture $b^3$ when the stem is pressed toward said plug by air-pressure.

The valve operates as follows: When a pump is connected with the stud B' and air forced into the valve, it passes into the aperture $b^3$ and issues against the stem D, thus forcing said stem away from the plug or cover B. The air now enters the tube or socket A and passes along the stem D to its groove D', through which it passes to and through the aperture $a'$ in the disk or head $a$. The reverse pressure of the air acts against the inner end of the stem D and presses the cushion E against the plug B to close the aperture $b^3$. By having the stem D cylindrical and of slightly less area than the bore of the tube or socket A said stem is kept in proper alignment without utilizing other parts for that purpose, whereby tilting of the stem is prevented and its proper fitting against the plug or cover B is assured. The stem D may be made of hard wood or other suitable material of light weight, so that its weight will act against the reverse pressure of the air as little as possible.

I have shown my improved valve as fitted to a pneumatic tire F, which may be of suitable construction. G is the ordinary rubber tube having a flange $G'$ for attachment to the tire or hose F in well-known manner. The aperture $G^2$, aligned with the aperture $a$ of the valve, admits air to the tire. The tube or socket A fits in the rubber tube G and may be cemented thereto or otherwise suitably connected therewith. This valve can also be used on foot-balls or other devices to retain air under pressure.

Having now described my invention, what I claim is—

The valve described comprising the tube or socket A with a contracted aperture in the inner end and with the outer end closed by a removable plug B having a central aperture $b^3$, screw threads $b$ for engagement with the socket, and an external thread $B'$ having screw threads $B^2$ for engaging as required with hose or a cap, in combination with a light body or stem D inclosed in such socket provided with a groove $D'$ across the inner end, a disk of yielding material as rubber at the outer end, the inner face of the said plug and the outer soft faced end being adapted to meet in a contracted surface near the center so as to maintain an air-tight joint by the force due to the air pressure, all substantially as herein specified.

In testimony that I claim the invention above set forth I affix my signature in presence of two witnesses.

SAMUEL E. SMITH.

Witnesses:
M. B. HARRIS,
M. F. BOYLE.